US008602149B2

(12) United States Patent
Krieger et al.

(10) Patent No.: US 8,602,149 B2
(45) Date of Patent: Dec. 10, 2013

(54) MOTORIZED BICYCLE WITH TRAINER MODE

(75) Inventors: Michael Krieger, Miami, FL (US); Henry Shum, Hong Kong (CN)

(73) Assignee: Evantage Limited, Hong Kong (CN)

( * ) Notice: Subject to any disclaimer, the term of this patent is extended or adjusted under 35 U.S.C. 154(b) by 0 days.

(21) Appl. No.: 13/389,664

(22) PCT Filed: Aug. 10, 2010

(86) PCT No.: PCT/US2010/045060
§ 371 (c)(1),
(2), (4) Date: Sep. 21, 2012

(87) PCT Pub. No.: WO2011/019743
PCT Pub. Date: Feb. 17, 2011

(65) Prior Publication Data
US 2013/0001000 A1    Jan. 3, 2013

Related U.S. Application Data

(60) Provisional application No. 61/232,669, filed on Aug. 10, 2009.

(51) Int. Cl.
*B62M 6/50*    (2010.01)
(52) U.S. Cl.
USPC ................. 180/206.3; 180/206.2

(58) Field of Classification Search
USPC .......................... 180/205.1–207.3
See application file for complete search history.

(56) References Cited

U.S. PATENT DOCUMENTS

| 3,921,745 A | 11/1975 | McCulloch et al. |
| 4,911,427 A * | 3/1990 | Matsumoto et al. ............. 482/9 |
| 5,163,439 A | 11/1992 | Dardik |
| 6,446,745 B1 | 9/2002 | Lee et al. |
| 6,629,574 B2 | 10/2003 | Turner |
| 6,976,551 B2 * | 12/2005 | Spanski ..................... 180/206.2 |
| 7,357,209 B2 | 4/2008 | Kokatsu et al. |
| 7,770,682 B2 * | 8/2010 | Spanski ..................... 180/205.4 |
| 2005/0029033 A1 | 2/2005 | Rip et al. |

* cited by examiner

*Primary Examiner* — Tony Winner
(74) *Attorney, Agent, or Firm* — Venable LLP; Robert Kinberg; Steven J. Schwarz

(57) ABSTRACT

An electric powered vehicle, including: a frame that supports a rider; a first wheel coupled to the frame; a second wheel coupled to the frame; pedals coupled to the frame, the pedals adapted to drive at least one of the first wheel and the second wheel; an electric motor coupled to at least one of the first wheel and the second wheel; a battery that supplies electrical power to the electric motor; a physiological sensor that detects at least one physiological parameter of the rider; and a controller that regulates operation of the electric motor based on the at least one physiological parameter of the rider.

8 Claims, 3 Drawing Sheets

MOTORIZED BICYCLE WITH TRAINER MODE

TECHNICAL FIELD

This patent application relates generally to motorized vehicles, such as scooters, electric bicycles, and mopeds. More specifically, this patent application relates to an electric bicycle that has a built in trainer mode.

BRIEF DESCRIPTION OF THE DRAWINGS

The foregoing aspects and other features and advantages of the invention will be apparent from the following drawings, wherein like reference numbers generally indicate identical, functionally similar, and/or structurally similar elements.

DETAILED DESCRIPTION

Embodiments of the invention are discussed in detail below. In describing embodiments, specific terminology is employed for the sake of clarity. However, the invention is not intended to be limited to the specific terminology so selected. A person skilled in the relevant art will recognize that other equivalent parts can be employed and other methods developed without departing from the spirit and scope of the invention. All references cited herein are incorporated by reference as if each had been individually incorporated.

Figure 1:
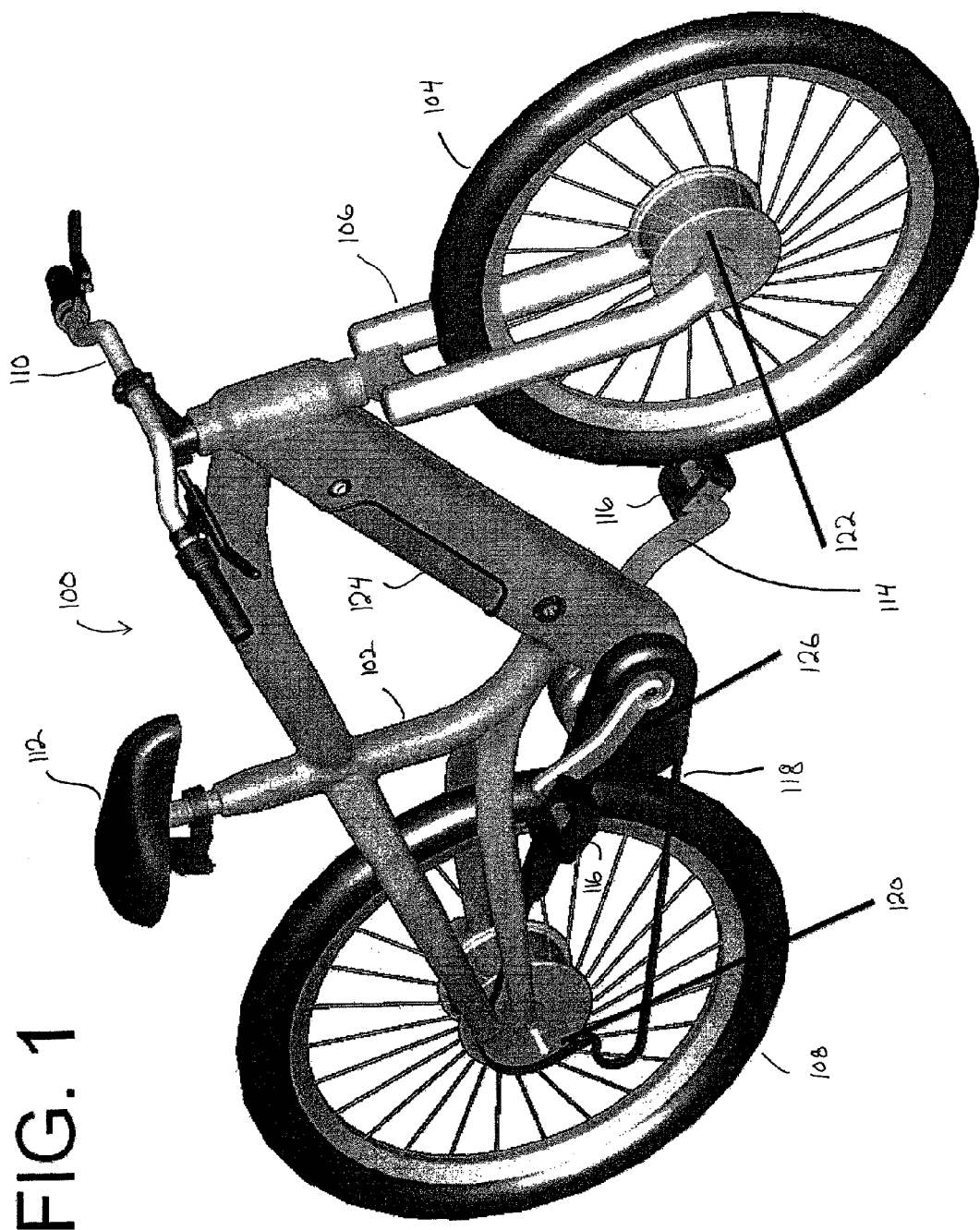
FIG. 1 is an illustrative perspective view of an electric bicycle according to an illustrative embodiment of the present invention.

Referring to FIG. 1, an illustrative embodiment of a motorized vehicle according to the present invention is shown. The motorized vehicle can comprise an electric bicycle, scooter, moped, or other type of vehicle driven by human and/or motorized propulsion. For the sake of simplicity, and without limiting the scope of the present patent application, the motorized vehicle will be described in connection with an electric bicycle.

As shown in FIG. 1, the bicycle 100 can generally include a frame 102, a front wheel 104 supported by the frame 102, for example, using a front fork 106, and a rear wheel 108 supported by the frame 102. The bicycle 100 can further include handlebars 110 coupled to the front wheel 104, for example, through the front fork 106, to provide steering of the front wheel 104. Additionally, the bicycle 100 can include a seat 112 to support the rider.

Still referring to FIG. 1, the bicycle 100 can also include a crank 114 with pedals 116, which can be turned by the rider to turn the rear wheel 108, for example, through a belt 118, chain, or other power transmission device. In addition, the bicycle 100 can include an electric motor 120 located in the hub of the rear wheel 108, and/or an electric motor 122 located in the hub of the front wheel 104. The bicycle 100 can further include a power source, such as a battery 124, and a controller 126, that delivers electric power from the battery 124 to the electric motor 120 and/or electric motor 122. According to an illustrative embodiment, the front and/or rear motors 122, 120 can comprise brushless motors, however, other types of motors are possible.

Figure 2:
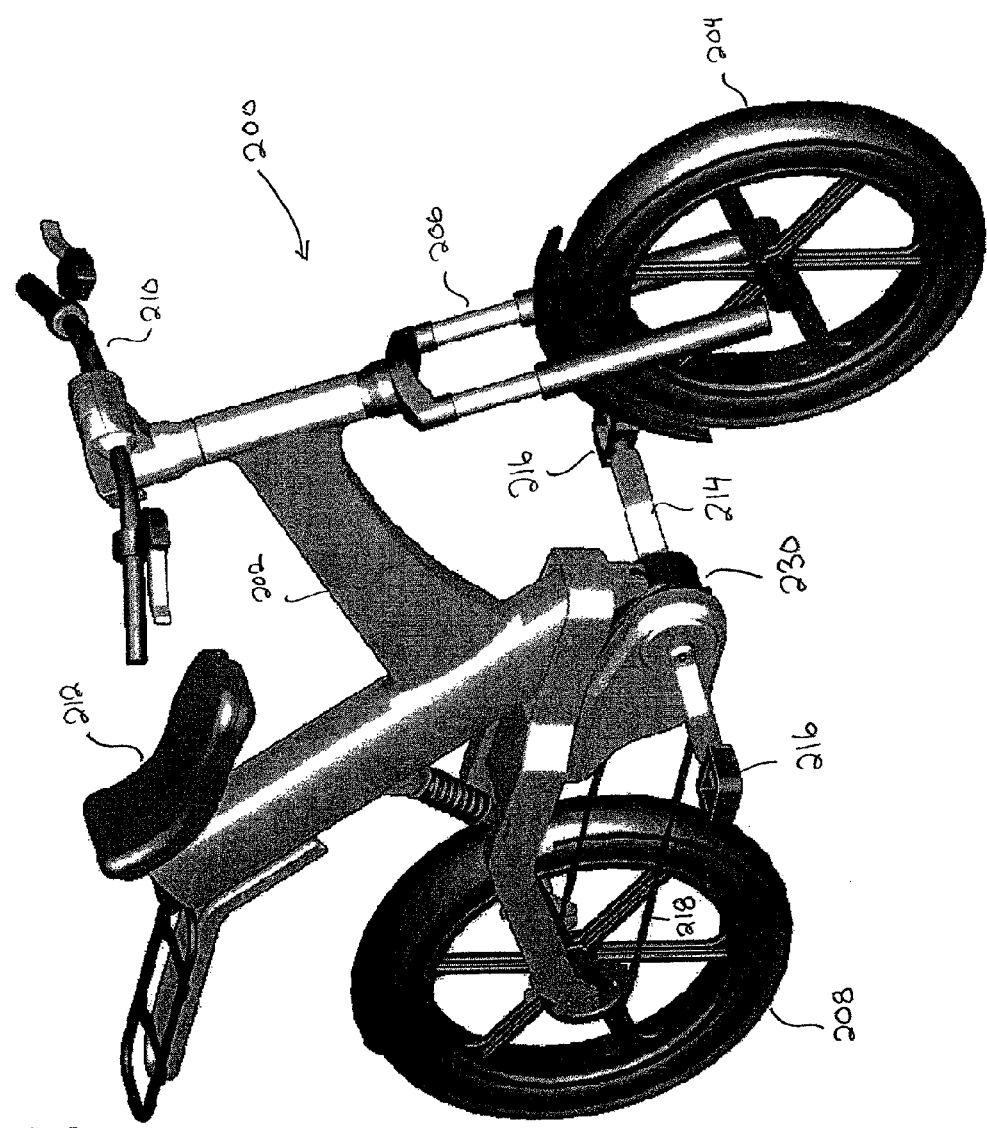
FIG. 2 is an illustrative perspective view of an electric bicycle according to another illustrative embodiment of the present invention.

Referring to FIG. 2, an alternative embodiment of a bicycle according to the present invention is shown. According to this illustrative embodiment, the bicycle 200 can generally include a frame 202, a front wheel 204 supported by the frame 202, for example, using a front fork 206, and a rear wheel 208 supported by the frame 202. The bicycle 200 can further include handlebars 210 coupled to the front wheel 204, for example, through the front fork 206, to provide steering of the front wheel 204. Additionally, the bicycle 200 can include a seat 212 to support the rider.

Still referring to FIG. 2, the bicycle 200 can also include a crank 214 with pedals 216, which can be turned by the rider to turn the rear wheel 208, for example, through a belt 218, chain, or other power transmission device. In addition, the bicycle 200 can include an electric motor (hidden from view) mid-mounted on the frame 202, for example, in a gearbox 230. The gearbox 230 can distribute power from the electric motor and the crank 214 to the rear wheel 208, for example, through the belt 218, chain, or other power transmission device. The bicycle 200 can further include a controller and a battery (both hidden from view) that provide power to the motor, in order to drive the rear wheel 208.

Figure 3:
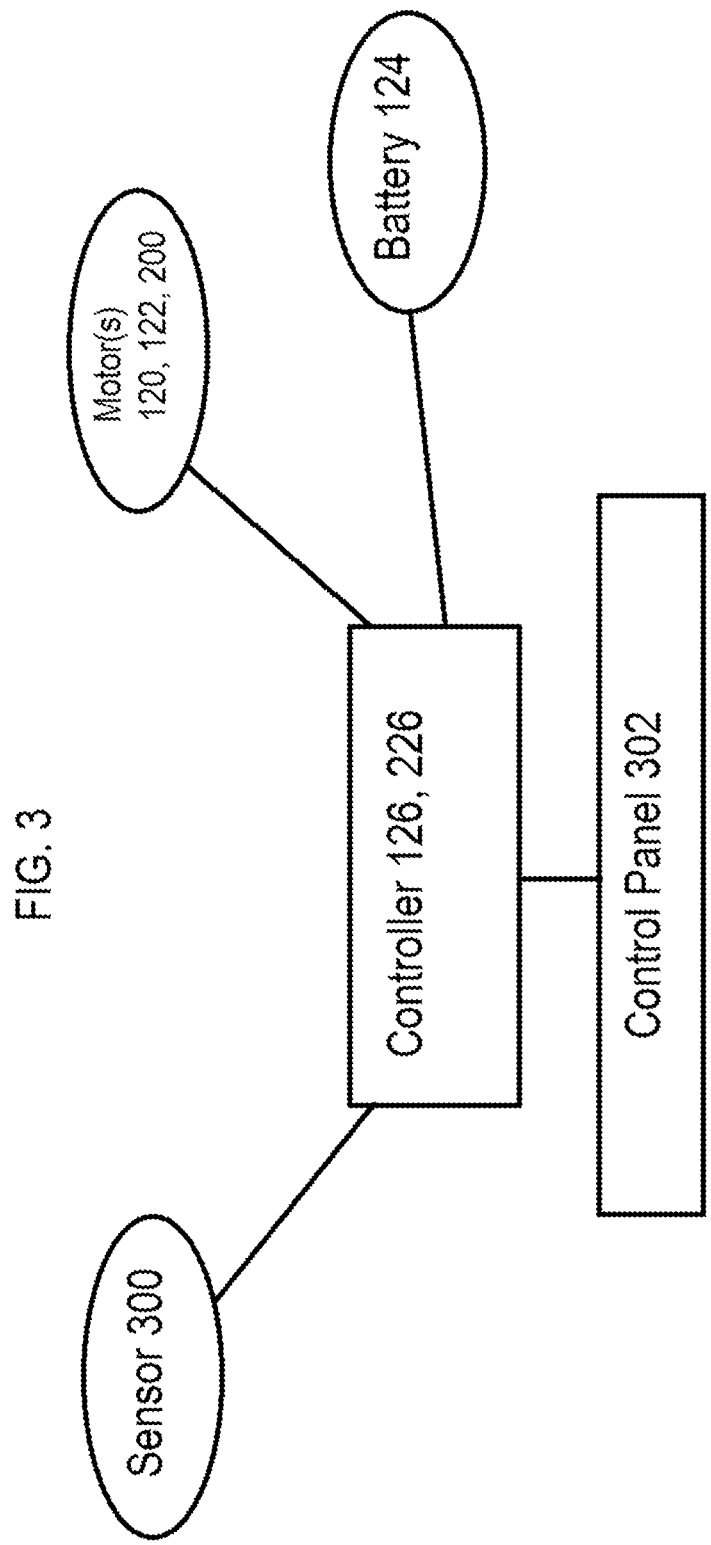
FIG. 3 is an illustrative block diagram of a controller, physiological sensor, electric motor, and other components of an electric bicycle according to the present invention.

The bicycles 100, 200 can each include a controller 126, 226, depicted in FIG. 3. The controller 126, 226 can regulate the operation of the electric motors 120, 122, and/or 220, for example, by increasing the electrical energy provided to the motors 120, 122, and/or 220 by the respective battery.

According to an illustrative embodiment, the controller 126, 226 can regulate the motors 120, 122, and/or 220 based on at least one physiological parameter of the rider, such as heart rate. Accordingly, the bicycles 100, 200 can operate in conjunction with a sensor 300 that detects the physiological parameter, and communicates it to the controller 126, 226, for example, wirelessly. According to an illustrative embodiment, the sensor 300 can comprise a heart rate monitor, which may be located, for example, in the grips of the bicycle 100, 200, in a chest strap to be worn by the rider, and/on in one or more gloves to be worn by the rider. According to an illustrative embodiment, the heart rate monitor can be located in a glove, which communicates with the controller 126, 226 via a bicycle grip, for example, through contact with the grip, or through wireless transmission.

According to an illustrative embodiment, the controller 126, 226 can activate electric motor 120, 122, and/or 220 (or increase output from motor 120, 122, and/or 220) only when the rider's heart rate meets or exceeds a predetermined upper level. As a result, the motor 120, 122, and/or 220 can selectively assist the rider in order to maintain their heart rate at or below a predetermined upper level. For example, the predetermined upper level can be 85% of the rider's maximum heart rate. As an example, the predetermined upper level can be determined by the following equation:

$$\text{Predetermined Upper Level} = 0.85 * (220 - \text{Rider's Age})$$

By selectively engaging the motor 120, 122, and/or 220 to assist the rider only when their heart rate meets or exceeds the predetermined upper level, the bicycle 100, 200 can ensure that the rider obtains an effective workout, while maintaining their heart rate at or below a safe level.

According to an additional or alternative aspect of the invention, the controller 126, 226 can engage the motor 120, 122, and/or 220 (or alternatively a dynamo associated with the crank 114, 214) to resist pedal movement in order to maintain the rider's heart rate above a predetermined lower level. This may be helpful, for example, when riding on flat terrain, where it is not as easy for the rider to elevate their heart rate. By engaging the motor 120, 122, and/or 220 (or a separate dynamo) to provide resistance against the rider's pedal strokes, the controller 126, 226 can maintain the rider's heart rate above a predetermined lower level. According to an illustrative embodiment, the predetermined lower level can be determined by the following equation:

Predetermined Lower Level=0.50*(220−Rider's Age)

The controller 126, 226 can selectively engage the motor 120, 122, and/or 220 to assist or resist the rider's pedal movement in order to maintain their detected heart rate between the predetermined upper level and the predetermined lower level.

When the motor 120, 122, and/or 220 (or a separate dynamo) is being used to resist pedal movement, the motor 120, 122, and/or 220 (or the separate dynamo) can operate to charge the bicycle's battery. In this case, a capacitor, resistor, light, or other component can be connected with the battery to prevent it from overcharging.

Still referring to FIG. 3, the bicycles 100, 200 can further include a control panel 302 in communication with the controller 300. The control panel 302 can display information, such as the amount of calories burned, current speed, average speed, current heart rate, average heart rate, and/or distance travelled. In addition, the control panel 302 can include one or more buttons to select different exercise programs (such as a cardio program or a fat burner program), which may, for example, adjust the upper and/or lower predetermined levels. Additionally, the control panel 302 can include a button to manually override the controller 126, 226, such that the bicycle operates in fully manual (non-assisted) mode.

According to another illustrative aspect of the invention, in certain circumstances, the controller 126, 226 can cause the motors 120, 122, and/or 220 (or a separate dynamo) to convert the rider's movement of the crank 114, 214, or to convert movement of the front or rear wheel, into electrical energy to charge the battery. According to an illustrative embodiment, the bicycle 100, 200 may have a set maximum speed which it cannot exceed, for example, in order to comply with state or federal regulations. When the bicycle 100, 200 reaches the set maximum speed, the controller 126, 226 can trigger the motor 120, 122, and/or 220 (or a separate dynamo) to resist turning of the front and/or rear wheels, thereby maintaining the bicycle 100, 200 at or below the set maximum speed. In this instance, the motor 120, 122, and/or 220 (or a separate dynamo) can re-charge the battery, for example, using regenerative braking.

Additionally or alternatively, the motor 120, 122, and/or 220 (or a separate dynamo) can convert pedal power into electrical power to charge the battery (instead of propelling the bicycle 100, 200 forward) when the bicycle 100, 200 reaches the set maximum speed. Thus, the user may continue to pedal once the bicycle 100, 200 reaches the set maximum speed, without exceeding the set maximum speed. Instead, at that point, the user's pedaling motion is used to recharge the battery. In the instance where a separate dynamo is coupled to the crank 114, 214, the dynamo and crank 114, 214 can be connected together, for example, using a belt, chain, gearbox, or other power transmission system known in the art.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

The invention claimed is:

1. An electric powered vehicle, comprising:
    a frame that supports a rider;
    a first wheel coupled to the frame;
    a second wheel coupled to the frame;
    pedals coupled to the frame, the pedals adapted to drive at least one of the first wheel and the second wheel;
    an electric motor coupled to the pedals and at least one of the first wheel and the second wheel;
    a battery that supplies electrical power to the electric motor; and
    a controller that regulates operation of the electric motor when the electric powered vehicle reaches a predetermined speed limit, whereby turning of the pedals causes the electric motor to charge the battery.

2. The electric powered vehicle of claim 1, wherein the controller regulates operation of the electric motor when the electric powered vehicle reaches the predetermined speed limit, whereby turning of the wheels causes the electric motor to charge the battery.

3. The electric powered vehicle of claim 1, further comprising:
    a physiological sensor that detects at least one physiological parameter of the rider; and
    a controller that regulates operation of the electric motor based on the at least one physiological parameter of the rider.

4. The electric powered vehicle of claim 3, wherein the controller regulates the electric motor to increase power output to at least one of the first wheel and the second wheel when the physiological parameter exceeds a predetermined upper level.

5. The electric powered vehicle of claim 4, wherein the predetermined upper level is determined by the following equation:
    predetermined upper level=0.85×(220-age of rider).

6. The electric powered vehicle of claim 4, further comprising a control panel operable by the rider to set different operating modes having different predetermined upper levels.

7. The electric powered vehicle of claim 3, wherein the physiological sensor comprises a heart rate monitor, and the physiological parameter is the rider's heart rate.

8. The electric powered vehicle of claim 7, wherein the heart monitor is located in a chest strap, a bicycle grip, or a bicycle glove.

* * * * *